(12) United States Patent
D'hondt et al.

(10) Patent No.: US 7,997,238 B2
(45) Date of Patent: Aug. 16, 2011

(54) ENGINE AND COOLING SYSTEM ARRANGEMENT FOR A HARVESTER

(75) Inventors: David D'hondt, Zedelgem (BE); Geert Vergote, Izegem (BE)

(73) Assignee: CNH America LLC, New Holland, PA (US)

( * ) Notice: Subject to any disclaimer, the term of this patent is extended or adjusted under 35 U.S.C. 154(b) by 752 days.

(21) Appl. No.: 12/148,370

(22) Filed: Apr. 18, 2008

(65) Prior Publication Data

US 2008/0257531 A1     Oct. 23, 2008

Related U.S. Application Data

(60) Provisional application No. 60/925,077, filed on Apr. 18, 2007.

(51) Int. Cl.
*F01P 1/06* (2006.01)
*F02B 77/04* (2006.01)

(52) U.S. Cl. ............... 123/41.31; 123/198 E; 123/195 C

(58) Field of Classification Search ............... 123/41.31, 123/41.49, 195 C, 198 E; 165/104.34, 104.19, 165/119, 95; 55/385.3, 392, 394, 307; 180/68.1, 180/68.2
See application file for complete search history.

(56) References Cited

U.S. PATENT DOCUMENTS

| | | | |
|---|---|---|---|
| 3,185,242 A | 5/1965 | Schwartz et al. | 180/54 |
| 3,630,003 A * | 12/1971 | Ashton et al. | 56/14.7 |
| 4,100,720 A | 7/1978 | Carnewal et al. | 56/14.6 |
| 4,372,409 A | 2/1983 | Mazur | 180/54 A |
| 4,443,236 A | 4/1984 | Peiler | 55/269 |
| 4,606,422 A | 8/1986 | Jewett | 180/68.1 |
| 4,906,262 A | 3/1990 | Nelson et al. | 55/290 |
| 5,466,189 A * | 11/1995 | Deutsch et al. | 460/100 |
| 6,272,819 B1 | 8/2001 | Wendte et al. | 56/11.9 |
| 7,134,518 B2 | 11/2006 | Arai et al. | 180/68.1 |
| 2003/0000752 A1 | 1/2003 | Hall et al. | 180/68.1 |
| 2005/0211483 A1 | 9/2005 | Pfohl et al. | 180/68.1 |

OTHER PUBLICATIONS

2 pp. Brochure, Cameco, a John Deere Company, 3510 Sugarcane Harvester.

* cited by examiner

*Primary Examiner* — Michael Cuff
*Assistant Examiner* — Hung Q Nguyen
(74) *Attorney, Agent, or Firm* — Michael G. Harms; Patrick M. Sheldrake

(57) ABSTRACT

The engine and cooling system arrangement includes an engine supported between the forward and rear ends of the frame of a harvesting machine, in an engine compartment. A cooler box containing at least one heat exchanger is disposed higher than and vertically offset from, the engine, and has an inlet opening facing sidewardly and covered with an air screen. A discharge opening faces in an opposite side direction. A fan generates a sideward air flow through the filter screen, cooler box and at least one heat exchanger, and outwardly through the discharge opening, away from an operator cab of the machine. A portion of the air flow will be directed into an air flow duct extending downwardly and forwardly to the engine compartment to create a positive air pressure condition therein, to limit infiltration of unfiltered air.

22 Claims, 7 Drawing Sheets

ENGINE AND COOLING SYSTEM ARRANGEMENT FOR A HARVESTER

This application claims the benefit of U.S. Provisional Application No. 60/925,077, filed Apr. 18, 2007.

TECHNICAL FIELD

The present invention generally relates to a harvesting machine, and, more particularly, to an engine and cooling system arrangement for a harvester, adapted for reducing contaminant build up, and resultant cleaning requirements and downtime, and particularly adapted for a sugarcane harvester.

BACKGROUND ART

The disclosure of U.S. Provisional Application No. 60/925,077, filed Apr. 18, 2007, is hereby incorporated herein in its entirety by reference.

During operation, sugarcane harvesters are typically subjected to frequent stops for cleaning contaminants and debris from the stationary air inlet screens, engine compartment and cooler box. This is due to the dirty and dusty environment in which the harvesters are operated, the dirt and dust being attracted to the surfaces of the cooler box and engine compartment due to the air being drawn through the air inlet screens over the engine compartment through the cooler boxes. Sucrose from the cane plants is also present, and contributes to the sticking of dirt, leaves and the like on these surfaces. As a result, open areas in the surfaces are blocked. When the restriction of the air flow over these components due to the blocked areas grows too big, overheating of the engine can occur. To avoid or correct this, the harvesting operation is interrupted for cleaning, which results in downtime and lost productivity.

Additionally, cane harvesters are typically used in hot environments, and it is desirable to avoid directing exhaust air from the cooling system and engine toward the operator cab of the harvester.

Accordingly, what is sought is an engine and cooling system arrangement for a harvesting machine, and; particularly, a cane harvester, which overcomes one or more of the shortcomings and limitations of the known arrangements, to reduce build up of contaminants on components thereof and blocking of passages therethrough, and resultant downtime and lost productivity for cleaning.

SUMMARY OF THE INVENTION

What is disclosed is an engine and cooling system arrangement for a harvesting machine, which can be, but is not limited to, a sugarcane harvester, which overcomes one or more of the shortcomings and limitations of the known arrangements, so as to reduce build up of contaminants on components thereof and blocking of passages therethrough, and resultant downtime and lost productivity for cleaning.

According to a preferred aspect of the invention, the harvesting machine includes a frame having a forward end, a rear end opposite the forward end, and first and second sides extending between the forward end and the rear end. The engine of the arrangement is supported on the frame at a first elevation intermediate the forward end and the rear end, and is contained in an engine compartment of sheet metal or other suitable construction. A cooler box of the cooling system is supported on the frame at a second elevation higher than the first elevation and preferably in vertically offset relation to the engine compartment, more preferably so as to be located rearwardly and above the engine. The cooler box is preferably of sheet metal or other suitable construction, and has an inlet opening adjacent to the first side of the frame, a discharge opening adjacent to the second side of the frame, and an interior, all of which define a sidewardly extending air flow path into the cooler box through the inlet opening, through the interior, and from the cooler through the discharge opening. The cooling system includes at least one heat exchanger disposed in the cooling box in the sideward air flow path, for flow of the air flow therethrough. The cooling system includes a fan configured and disposed for generating the sideward air flow along the air flow path through the cooler box and through the at least one heat exchanger and sidewardly outwardly from the cooler box through the discharge opening. The fan is preferably housed in a fan box downstream of the cooler box, and has a sidewardly facing outlet. Most of the air flow will be discharged from this outlet, such that substantially all of the air flow through the cooling system is sideward, well away from the operator cab.

Additionally, the cooling system includes an air flow duct extending to the engine compartment, for diverting or directing a portion of the air flow from the cooling system thereto, for generating a positive air flow condition therein. The air flow duct has an inlet disposed for receiving only a portion of the sidewardly directed air flow, and, for this purpose, is preferably located adjacent to a peripheral portion of the discharge opening of the cooler box. In this location, the air flow duct is only partially in the air flow path, so as to be configured for receiving only a portion of the air flow. The air flow duct extends downwardly to the engine compartment, such that the limited portion of the air flow will flow through the duct into the engine compartment in sufficient volume and with sufficient velocity, so as to create the desired positive air pressure therein.

According to another preferred aspect of the invention, the at least one heat exchanger includes at least one engine radiator and an intercooler radiator positioned such that portions of the air flow will flow through the radiators separately and simultaneously. In this regard, the peripheral portion of the discharge opening adjacent to which the inlet of the air flow duct is located, preferably comprises about a quadrant of the periphery of the discharge opening adjacent to the intercooler radiator, spaced from the engine radiator. A corner or edge of the periphery of the discharge opening is illustrated herein and is a preferred location. As an advantage of the selected location, most of the air flow which will enter the inlet of the duct will be from the intercooler, which will likely be at a lower temperature under many operating conditions, compared to the air from the engine radiator. More preferably, the engine radiator and the intercooler radiator are arranged in a stack, with the engine radiator above the intercooler radiator, with the inlet of the air flow duct being located at the periphery of the lower corner of the discharge opening, so as to be located adjacent to or extending along only one side or edge of the intercooler radiator. Here, it should be recognized that although the preferred stack locates the intercooler radiator at the lower position, alternatively, the engine radiator or another heat exchanger could be at this location.

According to another preferred aspect of the invention, the fan is located in a fan box disposed downstream of the cooler box in the air flow path, the fan box having a periphery extending around and defining an inlet opening and an outlet opening for the flow of the air flow through the fan box, and the inlet of the air flow duct being disposed in the fan box. The fan box preferably has a shape and extent about equal to that of the cooler box, and the air flow duct inlet preferably comprises about a quarter, or a quadrant or less of the periphery of the air flow area of the fan box. The rest of the fan box comprises an air outlet for the discharge of the remainder of the air flow.

According to another preferred aspect of the invention, the engine in includes an exhaust duct for carrying combustion gases away, and at least a portion of the exhaust duct, preferably including a muffler, is disposed in and extends through the air flow duct. Additionally, one or more fluid lines extending between the engine compartment and the cooler box, preferably extend through the air flow duct. These fluid lines can include, but are not limited to, one or both of the engine coolant lines extending between the engine and the engine radiator, and one or both of the intercooler lines extending between the intercooler and the intercooler radiator. Advantageously, the air flow duct will protect the exhaust duct and line or lines from build up of contamination of leaves, dirt and dust, and can also provide a cooling effect.

According to still another preferred aspect of the invention, the fan is rotatable by a belt drive extending through the air flow duct between the engine and the fan. And, the cooling system preferably utilizes a rotary air screen, with the belt drive configured for jointly rotatably driving the rotary air screen and the fan.

According to yet another preferred aspect of the invention, but not required, an air intake system of the engine will be disposed for receiving air from either the rotary screen or cooler box of the cooling system, such that the received air will be free of the above-mentioned contaminants, e.g., leaves dirt and dust. The air intake system can additionally include a finer particular filter and a pre-cleaner or dust separator, as desired or required for a particular application. Here, the air intake includes an inlet in connection with a lower quadrant of the cooler box, upstream of the heat exchangers, although other locations within the cooler box and/or air screen could be used.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
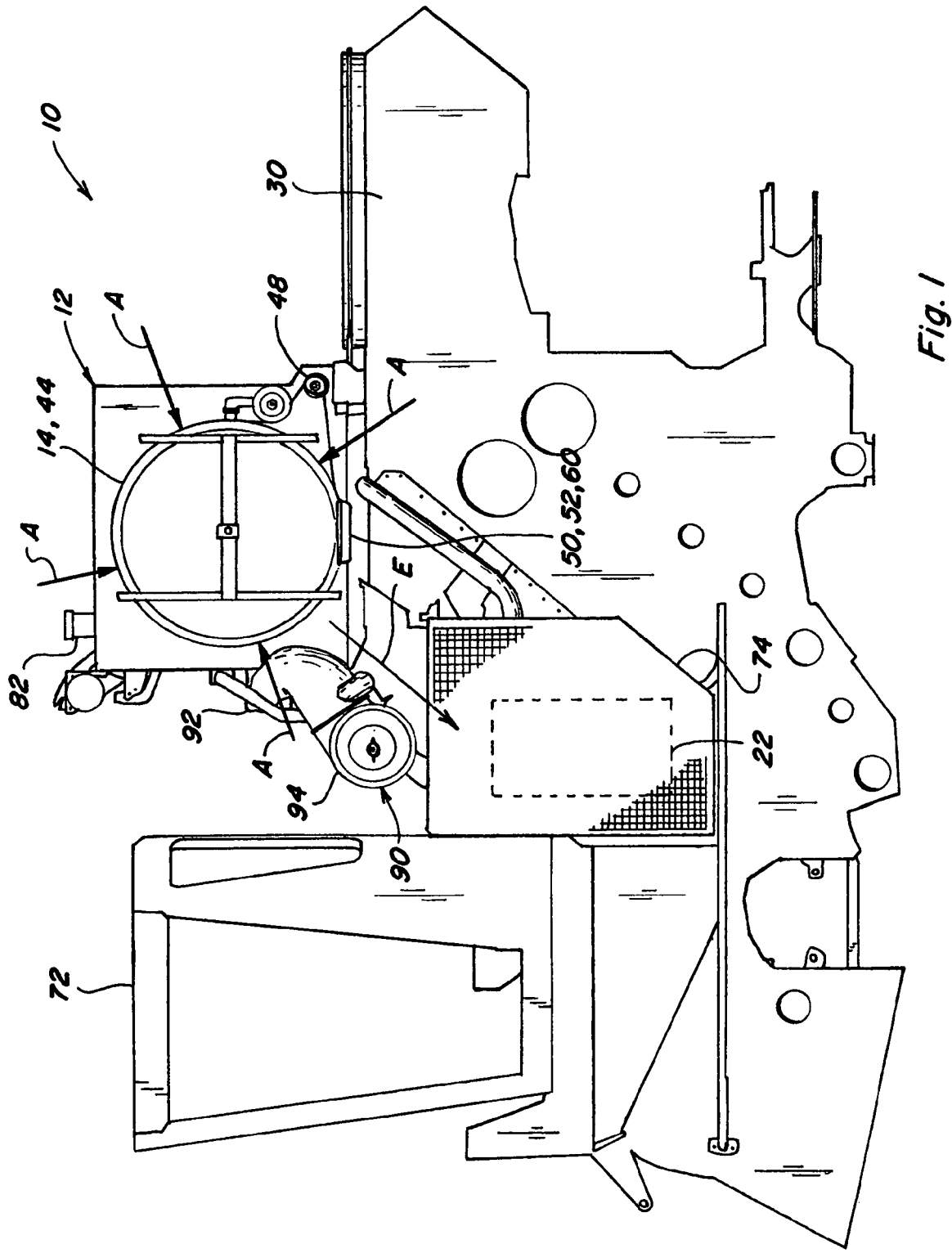
FIG. 1 is a side view of a frame of a sugarcane harvester including apparatus of the invention.
Figure 2:
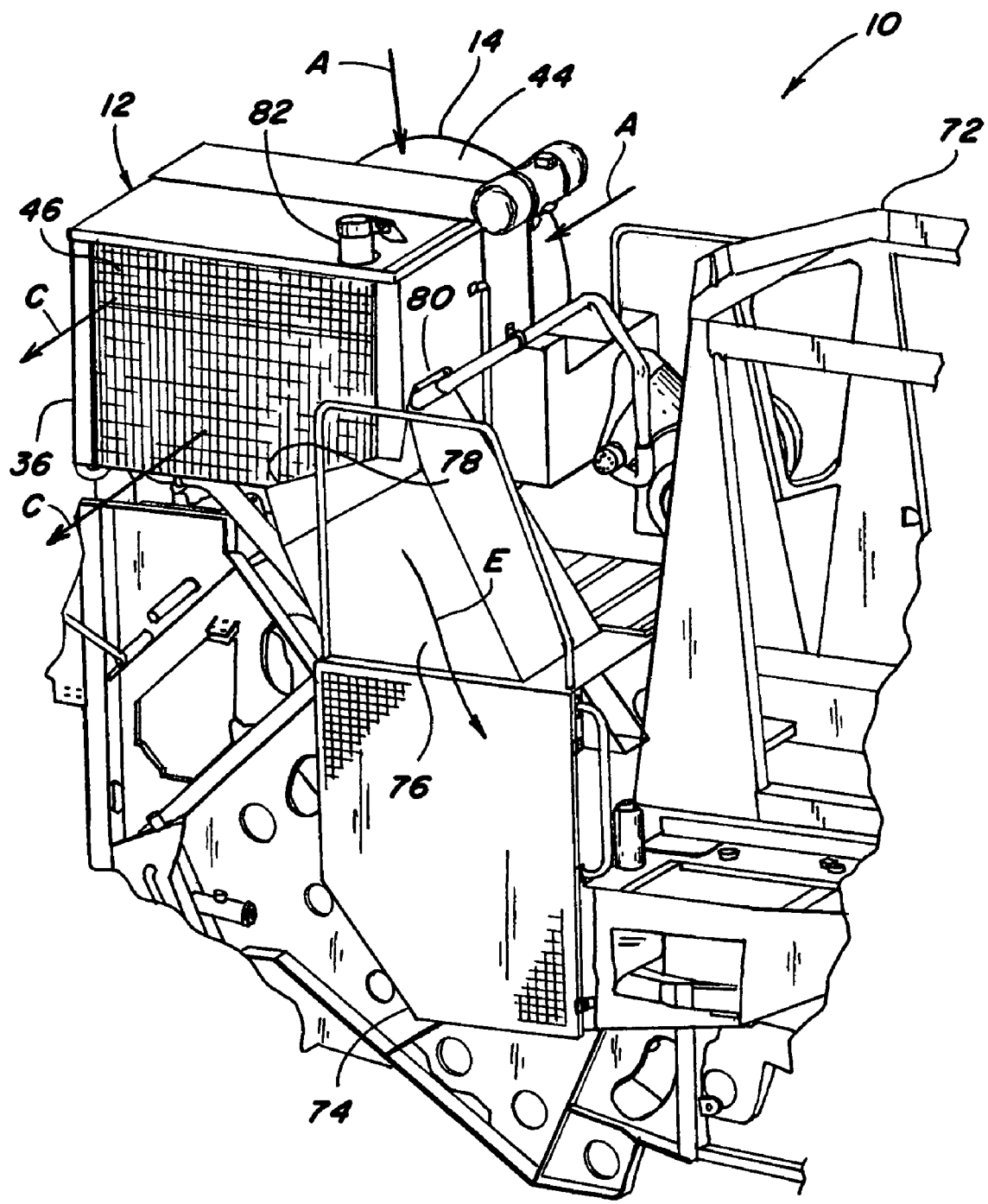
FIG. 2 is a fragmentary perspective view of the harvester frame of FIG. 1 showing aspects of the apparatus of the invention.
Figure 3:
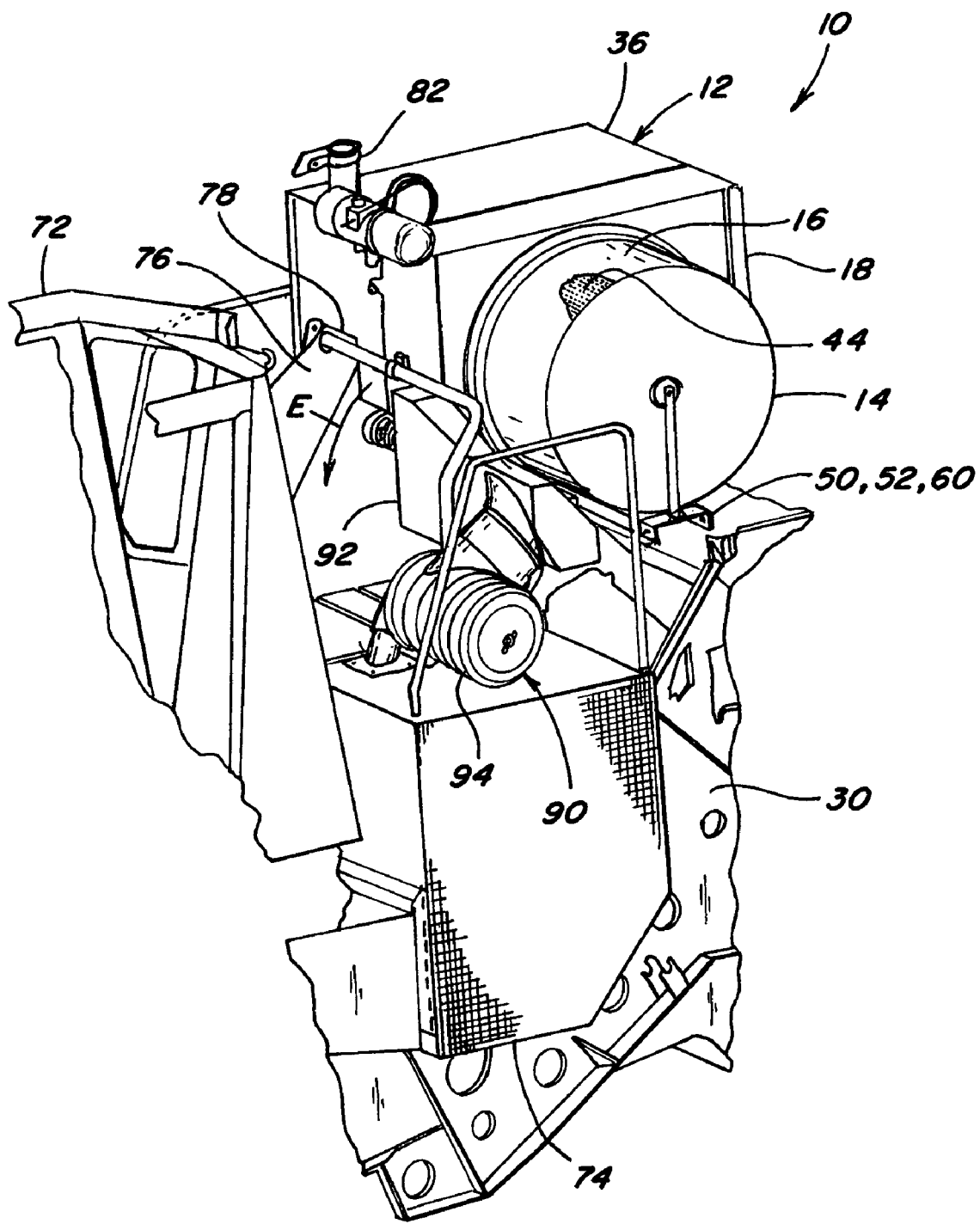
FIG. 3 is another fragmentary perspective view of the harvester frame of FIG. 1 showing additional aspects of the apparatus of the invention.
Figure 4:
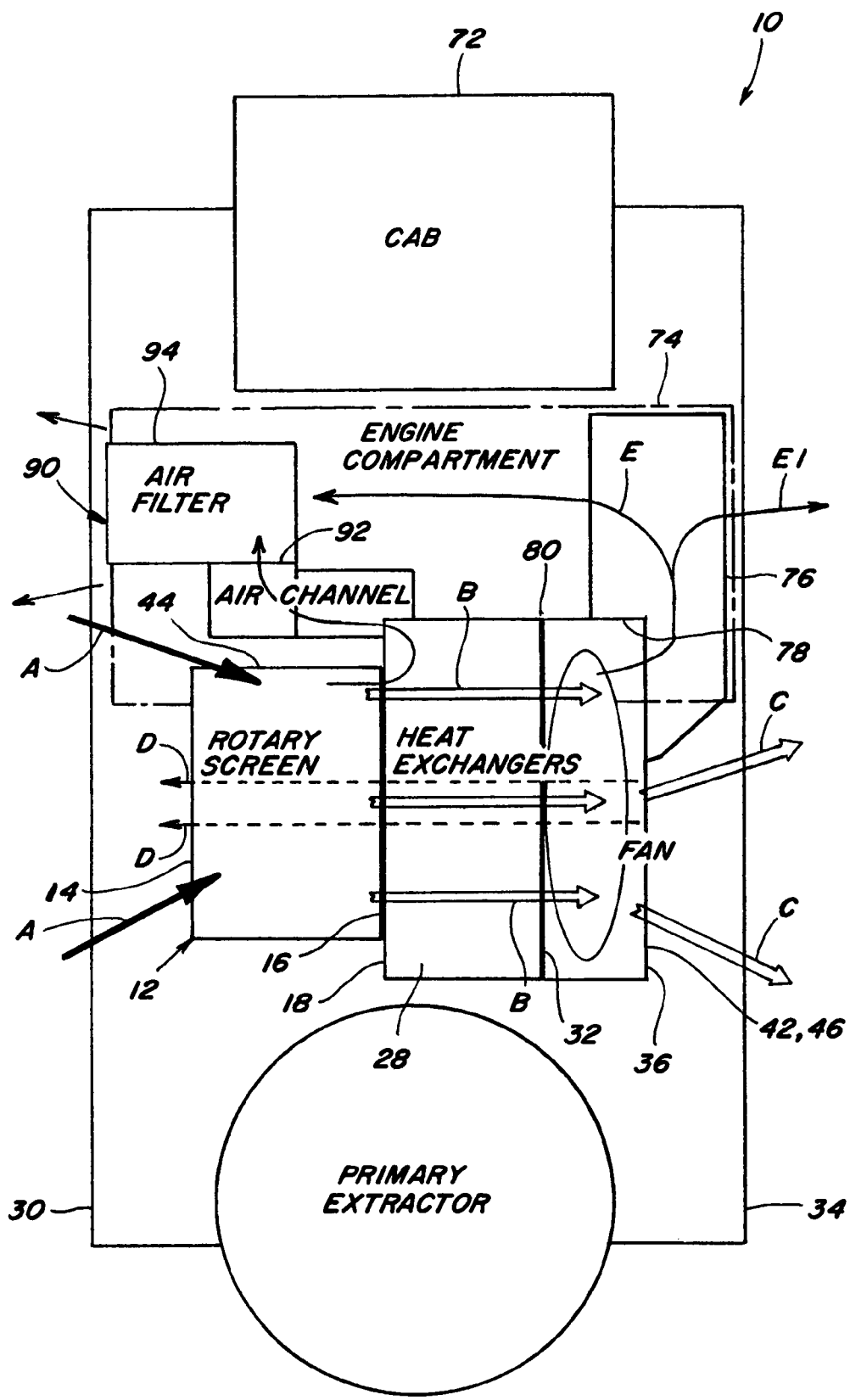
FIG. 4 is a diagrammatic representation of the apparatus of the invention.

Referring now to the drawings, in FIGS. 1, 2 and 3, a frame of a representative work machine, which is a sugarcane harvester frame 10, is shown including a cooling system 12 for cooling elements of the harvester in the well-known manner. Frame 10, when additional components are added, including wheels and driveline, harvesting apparatus, operator controls, and other well known features, will comprise a complete sugarcane harvester of well known construction. Reference in this regard, U.S. Pat. No. 6,272,819, which discloses a complete sugarcane harvester.

Referring also to FIGS. 4, 5, 5A and 6, cooling system 12 includes a rotary air screen 14 constructed and operable in a well-known manner, covering an air inlet 16 of a heat exchanger housing or cooler box 18 of cooling system 12 containing at least one heat exchanger. Here, the heat exchangers include, but are not limited to, an engine radiator 20, operable for cooling coolant of an engine 22; an oil cooler 24, for cooling oil of a hydraulic system (not shown); and an intercooler radiator 26, for cooling an air intake charge to engine 22. Here, the heat exchangers are arranged in a vertical stack within an interior 28 of cooler box 18, with engine radiator 20 in the top position, oil cooler 24 in the middle position, and intercooler radiator 26 in the bottom position, although it should be noted that other heat exchanger arrangements can be used as desired or required for a particular application.

Cooler box 18 is mounted on frame 10 such that rotary screen 14 and air inlet 16 are located adjacent a first side 30 of frame 10 and face in a first sideward direction, and a discharge opening 32 of cooler box 18 is located adjacent a second side 34 of frame 10 and faces in an opposite second sideward direction. Cooling system 12 includes a fan box 36 on the end of cooler box 18 opposite air screen 14, containing a fan 38 (FIG. 5) rotatable for generating a sideward flow of air into air screen 14, as denoted by arrows A, through interior 28 of cooler box 16, so as to pass through engine radiator 20, oil cooler 24, and intercooler radiator 26, and through discharge opening 32, as denoted by arrows B, and so as to flow through fan box 36, and be discharged from an outlet 42 thereof, as denoted by arrows C. Advantageously, this sideward flow is spaced away from an operator cab 72 of the harvester, for reduced noise and heat generation in the vicinity of the cab.

Rotary air screen 14 is a cylindrical structure having an outer circumferential surface which comprises a perforated screen surface 44 for the entry of a flow of air A. Similarly, outlet 42 of fan box 36 preferably has a perforated surface 46. In this embodiment, air screen 14 and fan 38 are jointly rotated by a belt drive 48 driven by engine 20, via a system of belts and pulleys, and a transfer shaft extending sidewardly between air screen 14 and fan 38. Air screen 14 is rotated principally for cleaning, as work machines, and particularly harvesters such as sugarcane harvesters, are typically operated in dirty and dusty environments, the dirt and dust being drawn against the outer surface of screen 14 by air flow A. Larger loose items, particularly leaves, will also be present in the cane harvesting environment, and can be drawn and held against screen 14 by the induction. This can be particularly problematic, as cane leaves, dirt and dust in the cane harvesting environment will typically carry sucrose, which is sticky, and if allowed to build up, will adhere itself and other matter to screen 14. As result, it is desirable to have the capability of removing this matter from the outer surface of screen 14. It is also desirable to have a self-cleaning capability, as a result of the volume of the matter that can build up and interfere with the operation of the apparatus.

Cooling system 12 includes a self-cleaning blow-off 50. Self-cleaning blow-off 50 is configured and operable in an operational or blow-off mode for substantially continuously removing debris or matter, including, but not limited to, leaves, dirt, and dust, from perforated screen surface 44, as screen 14 rotates. Additionally, blow-off 50 is operable in a self-cleaning mode for releasing or shedding matter that has built up as result of operation in the blow-off mode. Blow-off 50 can be operated in the self-cleaning mode periodically, from time to time, or responsive to an input, such as, but not limited to, an operator input or an automatic input from a sensor or the like generated when self-cleaning is required.

Figure 6:
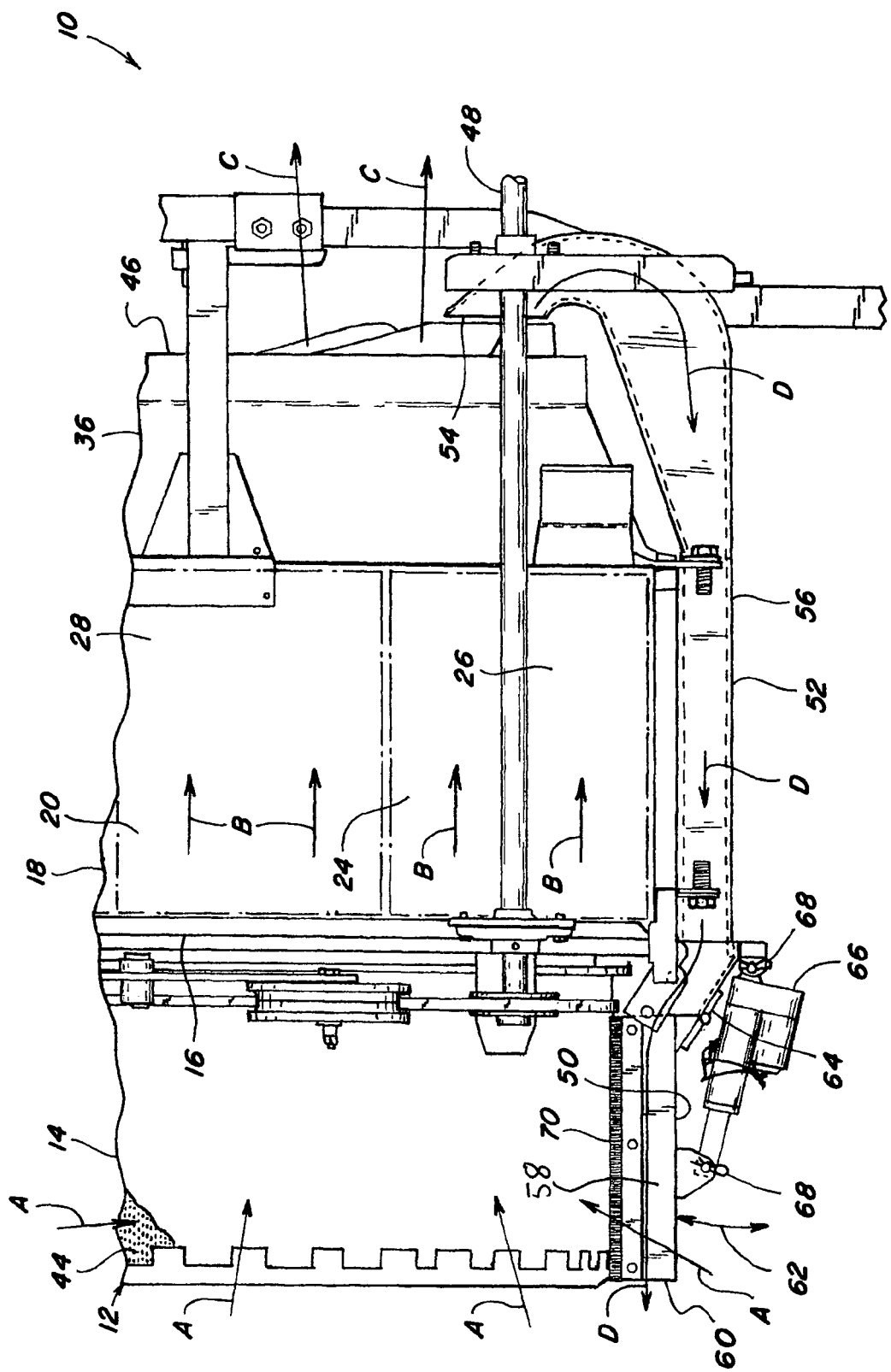
FIG. 6 is a fragmentary rear view of the apparatus.

As shown in FIG. 6, blow-off 50 includes a blow-off channel 52 which has an inlet 54 disposed adjacent a suitable source of pressurized fluid, which is preferably outlet 42 of fan box 36, for receiving a portion of flow of air C, and redirecting it toward air screen 14, as denoted by arrows D. Channel 52 includes a preliminary blow-off channel section 56, which includes inlet 54, and which has a C-shape when viewed from the side for redirecting the air flow D toward screen 14. Section 56 also narrows down or reduces in sectional extent downstream of inlet 54, for increasing air flow velocity therein. Preliminary blow-off channel section 56 extends beneath fan box 36 and cooler box 18, and slants upwardly toward the bottom of air screen 14. At this location, preliminary blow-off channel section 56 connects with a movable blow-off channel section 58, into which air flow D is directed.

Movable blow-off channel section 58 is an upwardly open U-shape member and extends to a discharge outlet 60 located below the end of screen 14. Movable blow-off channel section 58 is configured and supported to be movable between an operational position disposed directly beneath screen surface 44 of air screen 14 (shown), and a cleaning position disposed away from screen surface 44, as denoted by arrow 62. In the operational position, movable blow-off channel section 58 is positioned for directing flow of air D along screen surface 44 for blowing debris and dirt, e.g., leaves, dirt, and dust, outwardly away through discharge outlet 60. In the cleaning position, channel section 58 is preferably turned so as to be angled or slanted downwardly away from screen 14, so as to release any built up or accumulated debris or matter from section 58 and also screen surface 44.

FIG. 6 also shows movable blow-off channel section 58 connected by a connector 64 to section 56 for movement up and down between the operational and cleaning positions. The preferred connector 64 is a pivot or hinge, such as, but not limited to, a mechanical or living hinge, although other movable connectors could be used. Additionally, FIG. 6 shows an optional actuator 66 connected between sections 56 and 58. Actuator 66 is controllably operable for effecting movements of section 58 between the operational and cleaning positions. Here, actuator 66 is preferably a linear actuator, but, other actuators such as, but not limited to, a rotary actuator, could be used. Actuator 66 can be electrically, fluid, or otherwise suitably powered, as desired. Actuator 66 is connected to sections 56 and 58 by pivots 68, and is extendable for holding section 58 in the operational position, and retractable for pivoting or turning section 58 downwardly to the cleaning position.

Channel 58 can also include one or more brushes 70 extending lengthwise therealong, for brushing perforated surface 44, or spaced marginally therefrom, for brushing matter away, and will also operate for limiting escape of air from the channel to the side.

From time to time, or when movable channel section 58 is blocked, actuator 66 will be operated to move channel section 58 to the cleaning position, away from rotary screen 14. This will cause any debris that blocks the channel to fall and thus be evacuated from the channel so as to effectively clean the channel. After a selected amount of time, actuator 66 will be operated to move channel section 58 back to the operational position. This completes one self-cleaning cycle. In one mode of operation, during a certain timeframe, this cycle can be repeated several times.

As another possible mode of operation, channel section 58 can be moved to the cleaning position manually, for instance by operator actuation of an input device such as a pushbutton (not shown) in an operator cab 72 of the harvester. As another possibility, the input device can comprise a sensor, for instance, one which detects when channel section 58 is blocked, and which can generate a signal to a controller of actuator 66, and/or which can activate an alarm in operator cab 72 to inform the operator of the blockage such that the operator can manually actuate the operator input, e.g., pushbutton.

As still another option, a controller for actuator 66 can be a programmable device including software, or a timer device, which will operate actuator 66 at certain times; or it can be linked to the operation of other parts/functions of the harvester.

Rotary screen 14 of cooling system 12 is effective for providing a clean flow of air, denoted by arrows B, through cooler box 18, to significantly limit build up of any contaminants on the he exchangers therein, as well as the other interior surfaces thereof, and on fan 38. Contaminants such as cane leaves, dirt and dust in the cane harvesting environment can also cause problems in relation to engine 22, if allowed to build up thereon, and thus, engine 22 is preferably contained in an engine compartment 74. Additionally, it is desirable to have a positive air pressure condition in engine compartment 74, so as to limit infiltration of contaminants. To provide this, the present invention utilizes an air flow duct 76 configured to direct a flow of filtered air, denoted by arrow E, from cooling system 12 to engine compartment 74, sufficient for generating the desired positive air pressure condition in compartment 74. Engine compartment 74 can also include one or more openings or vents in a surface or surfaces thereof, for the outflow of air therethrough, as desired or required for achieving a desired positive pressure level therein. As a result, duct 76 will be the principal or only source of air to compartment 74, and will cause air to flow outwardly from the one or more other openings or vents in compartment 74, as denoted by representative arrow E1 in FIG. 4, as opposed to flowing into the compartment through the other opening or openings or vents.

Duct 76 is configured such that air flow E will be sufficient in quantity and pressure for creating the desired positive air pressure condition within compartment 74. To achieve this, duct 76 includes an inlet 78 in connection with the interior of fan box 36, adjacent to a peripheral portion 80 of discharge opening 32 of cooler box 18. This location is advantageous, as it positions inlet 78 only partially in the path of air flow B through opening 32. Additionally, inlet 78 is sufficiently small, so as to receive only a desired, effectively limited portion of the air flow B. As a result, most of air flow B will bypass inlet 78 and be discharged through outlet 42 of fan box 36. This is advantageous, as it allows air flows B and C to be sufficient in velocity and quantity to provide the needed heat transfer from the heat exchangers, e.g., engine radiator 20, oil cooler 24 and intercooler radiator 26, without undesirable back pressure and/or the need to increase the size of cooler box 18 or the heat exchangers.

Cooler box 18 is preferably disposed at an elevation above engine compartment 74. This location is advantageous as it places rotary screen 14 above much of the loose leaves and at least some of the dust generated by the harvesting operation. Additionally, cooler box 18 is preferably disposed rearwardly of compartment 74, so as to be spaced from operator cab 72, so as to reduce heat and noise therein from the operation of fan 38, and the air flow generated thereby. As a result, air flow duct 76 extends downwardly and forwardly to engine compartment 74.

Accorded to a preferred embodiment of the invention, peripheral portion 80 of discharge opening 32 of cooler box 18 preferably comprises or corresponds to about a quarter or quadrant of opening 32. This extent has been found to be advantageous, as it provides an air flow E which is sufficient so as to provide the desired positive pressurization and cooling of engine compartment 74, without creating an undesirable back pressure and reduction of cooling effect within cooler box 18. Peripheral portion 80 is also advantageously the lower front quadrant of the periphery, as it locates inlet 78 in connection with that portion of fan box 36 closest to engine compartment 74, and thus provides a more direct route to the engine compartment. Here, it should be noted that the term "quadrant" is intended to be defined generally as a fraction of about a fourth of the peripheral area, but which can be larger, or smaller, as required for providing the desired or required air flow. This term is also not intended be limited to only a corner of the periphery, as the inlet can be configured to extend along a side, upper or lower edge of the air flow path.

Figure 5:
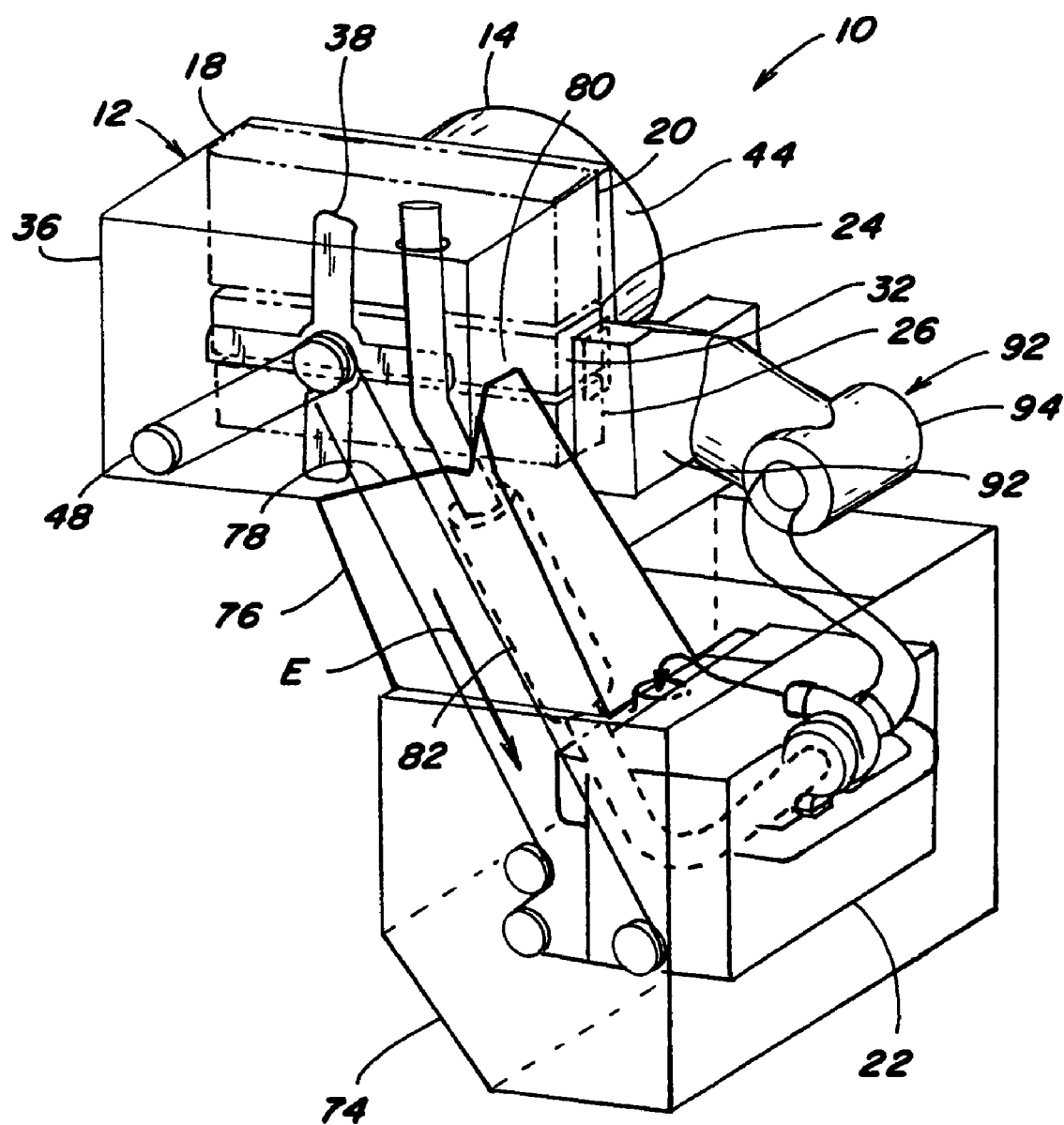
FIG. 5 is a schematic perspective view of the apparatus of the invention, illustrating engine exhaust duct routing through an air flow duct of the invention.
Figure 5A:
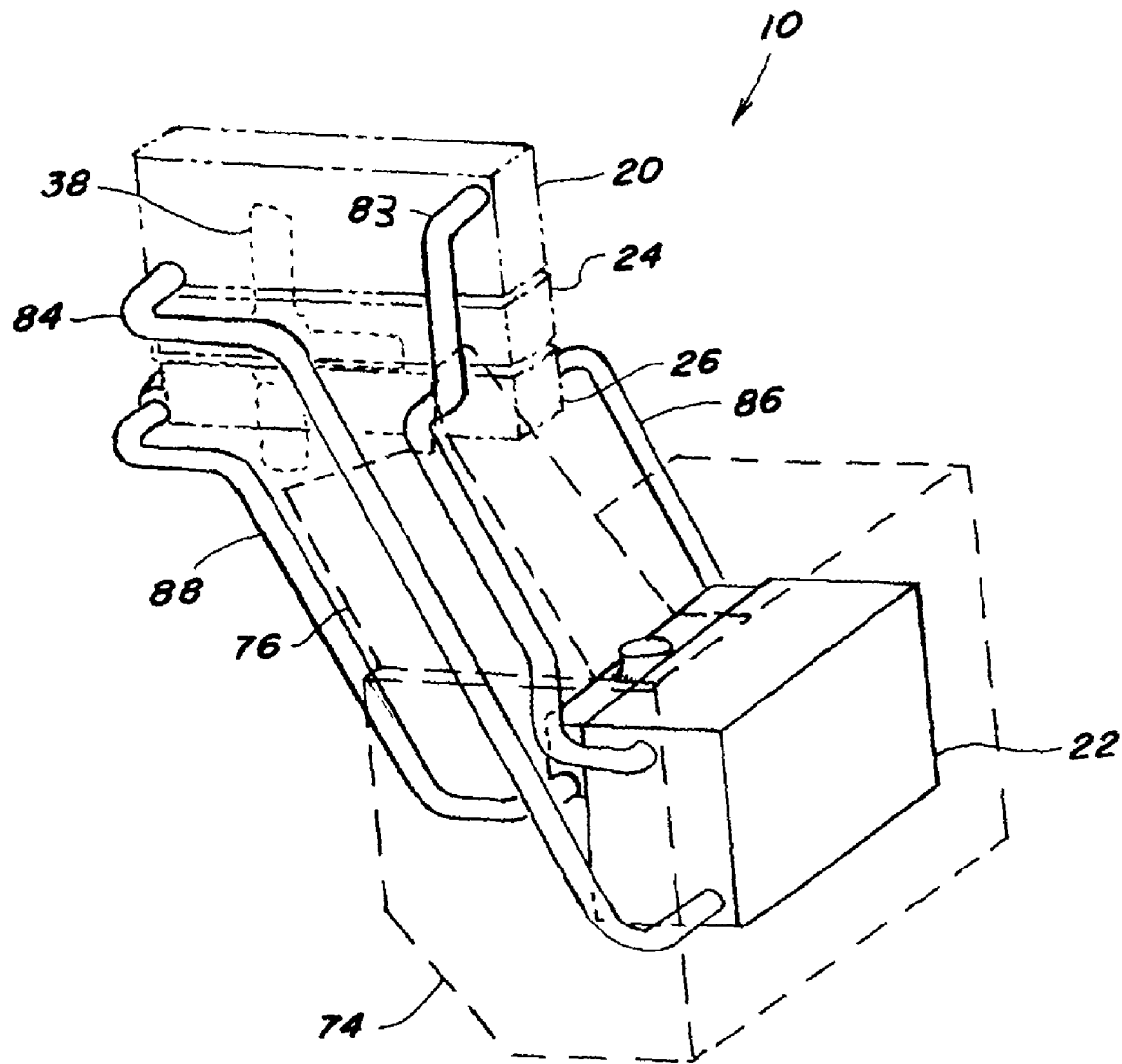
FIG. 5A is another schematic perspective view of the apparatus of the invention, showing fluid lines routed through the air flow duct.

Additionally, air flow duct 76 is preferably configured such that an exhaust duct 82 carrying combustion exhaust products from engine 22, preferably including a muffler of the exhaust duct, extends upwardly therethrough. This is advantageous, as it protects exhaust duct from contact with the environmental contaminants, e.g., leaves, dirt and dust, which can cause heat build up. This is also advantageous, as it allows routing exhaust duct 82 upwardly through fan box 36, for additional protection from contaminants. Further, in a similar regard, one or more fluid lines associated with engine 22 can be routed through duct 76, for protection from contaminants which can cause heat build up. For instance, as best illustrated in FIG. 5, engine coolant lines 83 and 84 extend upwardly from engine compartment 74 to engine radiator 20, through duct 76. Optionally, intercooler lines 86 and 88 could be routed through duct 76, with a similar advantage.

As still another feature of the invention, an air intake system 90 for engine 22, can be configured in cooperation with cooling system 12, for drawing intake air through rotary screen 14, to reduce the amount of contaminants in the air, and take advantage of the self-cleaning feature for screen 14. Here, air intake system 90 is shown including an air channel 92 in connection with interior 28 of cooler box 18 through the side thereof, air channel 92 connecting with an air filter 94 operable for filtering the air and ducted into engine 22.

Thus, it should be apparent that as a principal advantage of the invention, substantially all of the air utilized for cooling, and for providing a pressurized condition in the engine compartment, is received through a robust filtering system utilizing rotary screen 14, which is preferably provided with a self-cleaning blow-off capability, such that substantially no contaminants, e.g., leaves, dirt or dust will be admitted into the interior of the cooling system, and that, as a result of the positive pressurization, air will be positively discharged through virtually all of the other openings of the cooling system and engine compartment, to prevent contaminant infiltration. As a further advantage, the discharged air can be directed in its entirety, if desired, away from operator cab 72, for reducing noise and heat therein.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An engine and cooling system apparatus for a self-propelled harvesting machine, comprising:
    a frame having a forward end, a rear end opposite the forward end, and first and second sides extending between the forward end and the rear end;
    an engine supported on the frame at a first elevation intermediate the forward end and the rear end, the engine being contained in an engine compartment;
    a cooler box supported on the frame at a second elevation higher than the first elevation an in vertically offset relation to the engine compartment, the cooler box having an inlet opening adjacent to the first side of the frame, a discharge opening adjacent to the second side of the frame, and an interior, defining an air flow path into the cooler box through the inlet opening, through the interior, and from the cooler through the discharge opening, and at least one heat exchanger disposed in the air flow path for flow of the air flow therethrough;
    a fan configured and disposed for generating an air flow along the air flow path through the cooler box so as to flow through the at least one heat exchanger and outwardly from the cooler box through the discharge opening; and
    an air flow duct having an inlet disposed adjacent to a peripheral portion of the discharge opening of the cooler box and only partially in the air flow path, for receiving a portion of the air flow through the discharge opening, the air flow duct extending downwardly to the engine compartment, such that the limited portion of the air flow will flow through the duct into the engine compartment so as to create a positive air pressure condition therein.

2. Apparatus of claim 1, wherein the at least one heat exchanger comprises at least one engine radiator and an intercooler radiator positioned such that portions of the air flow will flow through the radiators separately and simultaneously, and wherein the peripheral portion of the discharge opening comprises about a quadrant of the periphery of the discharge opening.

3. Apparatus of claim 2, wherein the engine radiator and the intercooler radiator are arranged in a stack with the engine radiator above the intercooler radiator, and the quadrant of the periphery of the discharge opening is located adjacent to an edge of the intercooler radiator.

4. Apparatus of claim 2, wherein the fan is located in a fan box disposed downstream of the cooler box in the air flow path, the fan box having a periphery extending around and defining an inlet opening and an outlet opening for the flow of the air flow through the fan box, and wherein the inlet of the air flow duct is disposed in a corner of the periphery of the fan box.

5. Apparatus of claim 1, further comprising an exhaust duct in connection with the engine for carrying away exhaust gases generated thereby, and wherein at least a portion of the exhaust duct is disposed in the air flow duct.

6. Apparatus of claim 5, further comprising at least one fluid line extending between the engine compartment and the cooler box, through the air flow duct.

7. Apparatus of claim 1, wherein the fan is rotatable by a belt drive extending through the air flow duct between the engine and the fan.

8. Apparatus of claim 7, further comprising a rotary air screen, and wherein the belt drive is configured for rotatably driving the rotary air screen and the fan simultaneously.

9. Apparatus of claim 1, wherein the frame comprises a frame for a sugarcane harvester.

10. A self-propelled harvesting machine, comprising:
a frame having a forward end, a rear end opposite the forward end, and sides extending between the forward and rear ends;
an engine supported on the frame intermediate the forward end and the rear end, the engine being contained in an engine compartment;
a cooler box supported on the frame at an elevation higher than the engine and in vertically offset relation thereto, the cooler box having an inlet opening facing in a first sideward direction, a discharge opening facing in a second sideward direction opposite the first sideward direction, and an interior extending between the inlet and discharge openings;
at least one heat exchanger disposed in the interior of the cooler box;
a fan configured and disposed for generating an air flow in the second sideward direction through the cooler box such that at least a portion of the air flow will pass through the at least one heat exchanger and the discharge opening; and
an air flow duct having an inlet disposed adjacent to a portion of a periphery of the discharge opening of the fan box for receiving a limited portion of the air flow generated by the fan, the duct extending downwardly to the engine compartment, such that the limited portion of the air flow will flow through the air flow duct into the engine compartment so as to create a positive air pressure condition therein, and wherein at least a portion of an exhaust duct of the engine extends through the air flow duct.

11. The harvesting machine of claim 10, wherein the at least one heat exchanger comprises at least one engine radiator and an intercooler radiator, arranged such that portions of the air flow will flow therethrough simultaneously and separately, and wherein the portion of the periphery of the discharge opening comprises about a quadrant thereof disposed adjacent to the intercooler radiator.

12. The harvesting machine of claim 11, wherein the at least one heat exchanger further comprises a hydraulic oil cooler, and wherein the heat exchangers are arranged in a stack with the radiator in a top position, the hydraulic cooler in a middle position, and the intercooler radiator in a lower position.

13. The harvesting machine of claim 10, wherein the fan is located in a fan box and the exhaust duct extends upwardly from the air flow duct and passes through the fan box.

14. The harvesting machine of claim 10, further comprising at least one fluid line extending between the engine compartment and the cooler box through the air flow duct.

15. The harvesting machine of claim 10, wherein the fan is rotatable by a belt drive extending through the air flow duct between the engine and the fan.

16. The harvesting machine of claim 15, wherein the air screen comprises a rotary air screen, and the belt drive is connected in rotatably driving relation thereto.

17. The harvesting machine of claim 10, comprising a sugar cane harvester.

18. An engine and cooling system arrangement for a self-propelled harvesting machine, comprising:
an engine supported on a frame of the machine at a first elevation intermediate a forward end and a rear end thereof, the engine being contained in an engine compartment;
a heat exchanger housing supported on the frame rearwardly of the engine at a second elevation higher than the first elevation, the heat exchanger housing having an inlet opening facing in a first sideward direction and including a filter screen in covering relation thereto, a discharge opening facing in a second sideward direction opposite the first sideward direction, the heat exchanger housing containing at least one heat exchanger;
a fan configured and operable for generating an air flow into the heat exchanger housing through the filter screen, sidewardly through the at least one heat exchanger, and outwardly from the heat exchanger housing through the discharge opening; and
an air flow duct having an inlet disposed adjacent to a peripheral edge of the discharge opening of the heat exchanger housing in a position and orientation for receiving a portion of the air flow, the duct extending downwardly and forwardly to the engine compartment, such that the portion of the air flow will flow through the duct and enter the engine compartment so as to create a positive air pressure condition therein, and an exhaust duct of the engine and at least one fluid line extending upwardly through the air flow duct to the fan box.

19. The engine and cooling system arrangement of claim 18, wherein the at least one heat exchanger comprises an engine radiator and an intercooler radiator, and wherein the inlet of the air flow duct is positioned adjacent to a peripheral edge of the intercooler radiator, spaced from the engine radiator.

20. The engine and cooling system arrangement of claim 18, wherein the at least one heat exchanger further comprises a hydraulic oil cooler disposed between the engine radiator and the intercooler radiator.

21. The engine and cooling system arrangement of claim 18, wherein the exhaust duct extending through the air flow duct includes a muffler located in the air flow duct.

22. The engine and cooling system arrangement of claim 18, wherein the at least one fluid line comprises an engine coolant line.

* * * * *